Dec. 7, 1943.   T. BROWN ET AL   2,336,062
POWER LIFT
Filed Dec. 17, 1941   2 Sheets-Sheet 1

INVENTORS
THEOPHILUS BROWN
FRANK T. COURT
BY
ATTORNEYS

Dec. 7, 1943.  T. BROWN ET AL  2,336,062
POWER LIFT
Filed Dec. 17, 1941  2 Sheets-Sheet 2
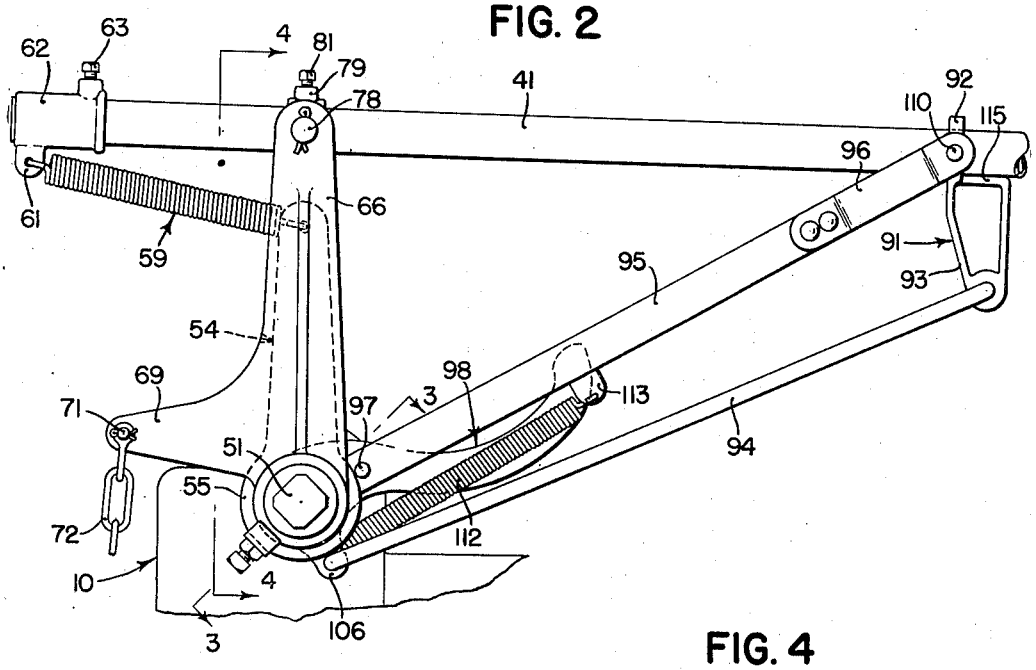
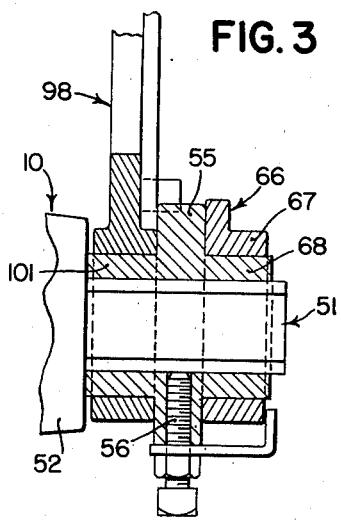 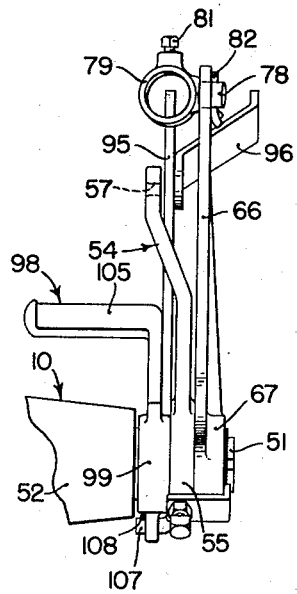
INVENTORS
THEOPHILUS BROWN
FRANK T. COURT
ATTORNEYS Patented Dec. 7, 1943

2,336,062

UNITED STATES PATENT OFFICE 2,336,062

POWER LIFT

Theophilus Brown and Frank T. Court, Moline, Ill., assignors to Deere & Company, Moline, Ill., a corporation of Illinois Application December 17, 1941, Serial No. 423,324

22 Claims. (Cl. 97—50)

The present invention relates generally to agricultural implements and more particularly to lifting means for tractor mounted implements especially adapted for row crop work.

The object and general nature of the present invention is the provision of an agricultural machine in which two sets of tools are provided, with power actuated means adapted to raise both sets through connections which permit either or both of said sets of tools to be raised, in connection with separately controlled locking means for holding either set against movement in either direction. An implement of this kind is admirably adapted for use with point rows or under other conditions where it is desirable to have each set of tools separately controlled but without losing the advantage of power lift means for raising both sets at the same time if desired.

More specifically, it is a feature of this invention to provide a tractor mounted cultivator of the type that is adapted to be mounted on a tractor having a single power lift rock shaft, with separate resilient connections between said rock shaft and the cultivator tools whereby the actuation of the power lift rock shaft in the lifting direction acts through springs or the like to raise both sets of cultivator tools but either set may be held against raising by suitable locking means, energy being stored to provide for the subsequent raising of the tools so held. Another feature of this invention is the provision of an implement of this character in which movement of the power lift rock shaft into its lowered position is adapted to accommodate the lowering of both sets of tools, in conjunction with selectively operable locking means effective optionally to hold either set against lowering, as desired.

These and other objects and advantages of the present invention will be apparent to those skilled in the art after a consideration of the following detailed description, taken in conjunction with the accompanying drawings in which the preferred embodiment of this invention have been illustrated.

In the drawings:

Figure 2 is an enlarged fragmentary side view, showing the resilient lifting connection and the separately operable locking means associated with each tool unit, the lifting and locking mechanism for the other unit being substantially identical;

Figure 3 is a fragmentary section taken generally along the line 3—3 of Figure 2; and Figure 4 is a view taken substantially along the line 4—4 of Figure 2.

Figure 1:
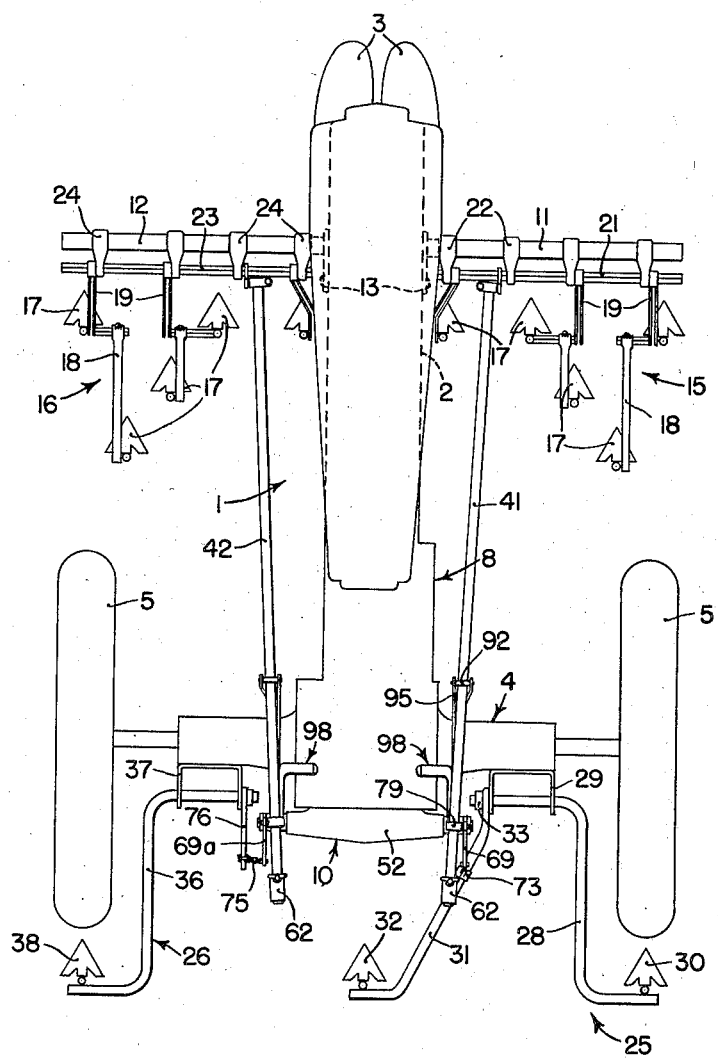
Figure 1 is a plan view of a tractor mounted cultivator in which the present invention has been embodied.

Referring now to the drawings, the present invention is shown as embodied in a tractor mounted cultivator in which the tractor is indicated in its entirety by the reference numeral 1 and includes frame means 2, front wheel means 3, a rear axle structure 4, and rear wheels 5 connected to axle shafts supported in the rear axle structure 4. The tractor motor is indicated at 8 and is connected not only to propel the tractor but also to actuate a power lift unit indicated in its entirety by the reference numeral 10 to which reference will be made below.

The tractor 1 adjacent its forward end carries two laterally outwardly extending draft bars 11 and 12. Preferably, each is in the form of a pipe member and secured, as by welding, to the inner end of each draft bar is an attaching plate 13 by which the draft bars 11 and 12 are secured to the frame of the tractor and thus provide means by which tools may be connected in draft transmitting relation and in supported relation with respect to the tractor. According to the present invention, the tools are separately actuated, and to this end I have shown the tools as in the form of two separate groups, indicated at 15 and 16, respectively. Each group or set of tools, as illustrated, includes a plurality of cultivator shovels 17 mounted on tool bars 18 that, in turn, are connected by parallel link means 19 with the associated draft bars. The right hand set of tools 15 is adapted to be raised and lowered by means of a rock shaft 21 supported in brackets 22 on the right hand draft bar 11, and the left hand set of tools, indicated at 16, is mounted in a similar way, by means including a rock shaft 23 rockably carried by the draft bar 12 in brackets 24. Rear sets of tools 25 and 26 are also shown. The rear set 25 includes a tool bar 28 pivoted on a bracket 29 fixed in any suitable manner to the right hand extension of the rear axle structure 4, the tool bar 28 carrying a shovel 30 disposed substantially rearwardly of the rear wheel 5 at the right side of the tractor. The tool unit 25 also includes an auxiliary tool bar 31 carrying a shovel 32 and connected, as at 33, to the tool bar 28 in substantially rigid relationship. The shovel 32 is disposed substantially in line with the front wheel means 3. The left hand tool unit 26 includes a tool bar 36 pivotally supported by a bracket 37 fixed to the left extension of the rear axle structure 4 and carrying a shovel 38 disposed rearwardly of the left hand tractor wheel 5.

The front and rear tools, in the conventional implement, are connected to be raised and lowered together by means of a pair of lift pipes 41 and 42 connected, respectively, between the power lift 10 of the tractor and the front sets of tools 15 and 16, the power lift 10 being also connected by link means 72 and 75, respectively, with the rear rigs 25 and 26, as will be referred to below. Thus, by actuating the power lift unit 10, all tools may be raised and lowered at the same time.

The implement and cultivator constructions as so far described are largely conventional, being similar to that shown in prior Patent 2,033,380, issued March 10, 1936, to T. W. Johnson, to which reference may be made if necessary. The present invention is more particularly concerned with the provision of means making it possible to utilize the power lift unit 10 in the same way as heretofore, but with the additional provision of means providing a separate or individual controls for the tools at either side of the tractor independently of the other tools, thereby providing an implement which is particularly constructed to operate on point rows, where it is necessary or desirable to have the tools at one side of the row operate a short distance after the tools at the other side have been raised.

Referring now more particularly to Figures 1 and 2, the power lift unit 10 includes a transversely disposed rock shaft 51 which extends laterally outwardly of the housing 52 (Figure 1) of the power unit 10 at each side thereof. Two separately controlled sets of connections are provided between the transverse power lift rock shaft 51 and the right and left hand tools, and since the connections at one side are substantially identical with the connections at the other side, only one set will be described in detail. Referring now more particularly to Figures 2, 3 and 4, the right end of the power lift rock shaft 51, which extends laterally outwardly of the associated casing 52, receives a power actuated lifting arm 54 which is formed with a hub section 55 mounted in non-rotatable fashion on the associated end of the rock shaft 51. A set screw 56 may be provided for fixing the arm 54 to the rock shaft 51. The outer or upper end of the arm 54 is apertured, as at 57 (Figure 4) and receives the forward end of an energy storing spring 59. The rear end of the spring 59 is fixed to an apertured lug 61 that is carried by or forms a part of a sleeve 62. The latter carries a set screw 63 by which the sleeve member 62 may be fixed in various positions of adjustment to the associated cultivator lifting member 41, the latter preferably being in the form of a pipe of circular cross section.

The rear end of the cultivator lift pipe 41 is supported by means of a vertically extending arm member 66, the lower end of which is formed with a hub section 67 (Figure 4) that is mounted on the outer portion 68 of the hub 55. The arm member 66 is provided with a rearwardly extending section 69 which is apertured to receive a pin 71 connecting the upper end of a lifting chain 72 thereto. The lower end of the lifting chain 72 is connected to a suitable bracket, such as a collar 73, fixed to the tool bar section 31 of the rear tool unit 25. The corresponding extension 69a (Figure 1) of the left hand set of connections is connected by means of a chain 75 to an arm 76 that is fixed to the inner end of the left hand rig beam 36. A pivot member 78 is disposed in an aperture in the upper end of the arm 66 and is provided with an eye section 79 through which the rear end of the cultivator lift pipe 41 extends. The eye section 79 carries a set screw 81 by which the member 78 may be fixedly secured to the lift pipe 41. A cotter key 82 serves to hold the pivot member 78 in position in the upper end of the arm 66.

The connections between the left end of the rock shaft 51 and the left hand cultivator lift pipe 42 is substantially the same as has been described, and therefore further description is believed to be unnecessary. In operation, whenever the power lift mechanism 10 is actuated, for example, to rock the rock shaft 51 in a clockwise direction (Figure 2), the lifting arms 54 swing forwardly and exert a pull through the springs 59 against the rear ends of the cultivator lift pipes 41 and 42, thus lifting the front sets 15 and 16. At the same time, the forward swinging movement of the arms 66 swing the extensions 69 upwardly, thus exerting a pull through the chains 72 and 75, thus raising both of the rear sets of tools 25 and 26. Normally, the springs 59 are so constructed that they are enabled to transmit sufficient force to raise the tools without being materially deflected or stretched.

According to the principles of the present invention, we provide means for selectively locking either the right sets of tools or the rear sets of tools either in a raised or a lowered position. Preferably, the locking mechanism comprises two separate units, and since these units are substantially identical, a description of one will suffice.

Referring now to Figures 2, 3 and 4, a clamping member 91 is provided with a ring section 92 which encircles the associated lifting pipe 41, and the lower section is extended, as at 93, and is apertured to receive the upper and forward end of an actuating link 94. A brace or support member 95 carrying a hammer strap 96 is pivotally connected, as at 97 (Figure 2) to a foot pedal 98, the latter having a hub section 99 that is rockably mounted on the inner hub section 101 of the lifting arm 54, as best shown in Figure 3. The foot pedal 98 is provided with a tread extension 105 and a lower apertured lug 106 in which the laterally turned end 107 of the actuating link 94 is disposed. A cotter key 108 is passed through an opening in the end 107 of the link 94 to hold the latter in place with respect to the foot pedal member 98. A similar arrangement holds the link 94 in place in the clamping member 91. The upper end of the bracing member 95 and the end of the hammer strap 96 are apertured to receive trunnions 110 that are formed on or carried by the clamping member 91, and a spring 112 is connected at its upper end to a lug 113 formed on or carried by the brace member 95. The lower end of the spring 112 is connected to the pedal member at any suitable point, preferably to the eye end of the cotter 108 (Figure 4) that holds the lower end of the actuating link 94 in the lug 106. The extended portion 93 of the locking member 91 is provided with a shouldered section 115 that is adapted to engage the under portion of the lift pipe 41 when the ring section 92 extends at approximately exactly right angles to the pipe 41, in which position the pipe 41 is free to slide longitudinally through the ring section 92. However, if the locking member 91 is rocked in a clockwise direction (Figure 2) about the axis defined by the trunnions 110, the ring member is moved into an angled or clamping position with respect to the lift pipe 41, by which means the latter is securely held against movement in either direction, the brace member 95 cooperating with the clamping ring section 92 in thus locking the member 41 against movement. The clamping member 91 may be moved into this clamping position by the operator stepping on the foot pedal 98, such movement swinging the apertured lug 106 rearwardly and rocking the locking member 91 in a clockwise direction (Figure 2). Such movement stretches the spring 112 so that as soon as the operator takes his foot off of the pedal member 98, the spring 112 restores the parts to their released position, as shown in Figure 2. The locking mechanism for the left hand lift pipe 42 is of substantially the same construction and therefore further description is unnecessary.

The operation of the present invention is substantially as follows.

Figure 1 and Figure 2 show the parts in the positions they occupy when the tools 15, 16 and 25, 26 are in a lowered or working position. Assuming that the outfit is being used to cultivate point rows, when the operator approaches the end of the field, and which it will be understood lies at an angle to the rows making it necessary to raise the tools at one side of the tractor a small distance before the other tools are raised, when the operator reaches the point where he desires to raise the tools at one side of the tractor, he actuates the power lift unit 10 and at the same time steps on the pedal 98 of the locking mechanism associated with the tools that he desires to hold in operating position. The resulting swinging movement of the rock shaft 51, in a clockwise direction as viewed in Figure 2, results in the forward swinging movement of both arms 54. The movement of the arm 54 that is associated with the tools not held in locked position is transmitted through the associated spring 59 to the lift pipe. This moves the latter, together with the associated arm 66, and raises the tools at that side of the tractor. So long as the operator continues to hold the foot pedal 98 of the other tools down in locked position, the lift pipe at that side of the tractor will be locked against any movement, and therefore the associated tools will be maintained in operating position. However, the rocking movement of the rock shaft 51 and the arm 54 at that side of the tractor stretched the associated spring 59, thus storing energy therein. This energy will then become effective the moment the operator releases the foot pedal 98, which he does when the outfit reaches the point at which he desires the other tools to be raised.

After the operator has turned the outfit around and is ready to start cultivating again, it is also necessary to lower one set of tools before the other set. In the cultivator outfit described, the tools are lowered by the action of gravity, which is brought into effect by actuating the power lift unit 10 to cause the rock shaft 51 to be free to rock in a counterclockwise direction (Figure 2). Therefore, when the operator reaches the point where he desires the sets of tools at one side of the tractor to lower, he actuates the power lift mechanism 10 at the same time stepping on the pedal 98 for the other tools, thus holding the latter in raised position while the other tools are permitted to lower. Then when the operator reaches the point where he desires the second sets of tools to lower, all that he has to do is to release the foot pedal 98. It will thus be seen that by virtue of the present invention we have provided means whereby the tractor power lift may be actuated in the usual manner to raise or lower all of the tools simultaneously, but in addition we have provided controllable locking means which is effective to lock either group of tools in either their raised or lowered position while permitting the other tools to be raised or lowered as desired.

While we have shown and described above the preferred structure in which the principles of the present invention have been incorporated, it is to be understood that our invention is not to be limited to the particular means shown and described above but that, in fact, widely different means may be employed in the practice of the broader aspects of our invention.

What we claim, therefore, and desire to secure by Letters Patent is:

1. An agricultural implement comprising a pair of shiftable operating units, a single shifting means including a pair of resilient connections connected respectively with said units for shifting either or both of said units, and means for holding either of said units against movement when said shifting means is operated to shift the other unit.

2. A two-row tractor cultivator comprising laterally spaced tools for cultivating two crop rows, separate resilient means connected with each tool, means acting through the associated resilient means for raising either of said tools and storing energy in the resilient means associated with the other tool, and releasable holding means for holding either of said tools against movement, subsequent release of said holding means releasing the associated tool for movement into raised position by the associated resilient means.

3. An agricultural implement comprising a pair of shiftable operating units, a power operated member, a pair of energy-storing springs connecting said member with said units, whereby either or both of said units may be shifted by said power operated member, and means for holding either of said units against movement when said power operated member is actuated, whereby the energy stored in the spring connected with the held unit supplies power for shifting said latter unit when it is released by the holding means.

4. In an implement, the combination of a frame, a tool connected with said frame for movement relative thereto, means adapted to be actuated to shift the position of said tool, means connected with the latter and serving as a connection between said shifting means and said tool for storing energy received from said shifting means when the latter is actuated and the tool is prevented from moving, and optionally engageable means biased for movement into a position releasing said tool for movement but adapted to be engaged with the latter to hold said tool against movement, whereby force is stored in said force storing means upon the operation of said shifting means and thereby providing for subsequent movement of said tool upon the release of said optionally engageable means.

5. An agricultural implement comprising means serving as a frame, a power operated unit thereon, a pair of independently movable parts connected with said frame, a pair of independently actuable resilient means connecting said independently movable parts with said power unit whereby operation of the latter is adapted to transmit movement through said resilient means, respectively, to said parts, and a pair of independently operable clamps engageable, respectively, with the associated parts, each clamp being adapted to engage and secure the associated part against movement, the associated resilient means storing energy upon the actuation of said power unit and providing for the subsequent operation of the associated part upon the release of the associated clamp.

6. A tractor implement adapted to be attached to a tractor having a power lift rock shaft, comprising a pair of separately movable tool means, an arm fixed to each end of said rock shaft, a pair of resilient means connecting both of said tool means with said power lift arms, a pair of releasable locks adapted to hold either of said tool means against movement when the power lift rock shaft is rocked, means biasing said locks for movement into a released position, and a manually controlled part associated with each lock for moving the latter into locked position.

7. In a tractor cultivator of the type in which the tractor includes a power lift rock shaft and the cultivator includes a longitudinally movable lift member, a delayed lift attachment comprising an arm adapted to be fixed to said power lift shaft, an energy storing spring connected at one end with said arm, detachable means adapted to connect the other end of said spring with said cultivator lift member, and optionally operable clamping means adapted to releasably hold said cultivator lift member against movement, whereby the operation of said power lift shaft serves to store energy in said spring whereby the subsequent release of said clamping means causes said spring to move said cultivator lift member.

8. In a tractor cultivator of the type in which the tractor includes a power lift rock shaft and the cultivator includes a longitudinally movable lift member, a delayed lift attachment comprising an arm adapted to be fixed to said power lift shaft, an energy storing spring connected at one end with said arm, detachable means adapted to connect the other end of said spring with said cultivator lift member, a supporting arm adapted to receive said cultivator lift member in slidable relation and adapted to be loosely mounted on said power lift rock shaft, clamping means adapted to be engaged with said cultivator lift member at a point spaced longitudinally thereof, a brace member connecting said clamping means with said supporting arm, and means for controlling said clamping means.

9. In a tractor cultivator of the type in which the tractor includes a power lift rock shaft and the cultivator includes a longitudinally movable lift member, a delayed lift attachment comprising an arm adapted to be fixed to said power lift shaft, an energy storing spring connected at one end with said arm, detachable means adapted to connect the other end of said spring with said cultivator lift member, said arm having a hub member, a support arm journaled for rocking movement relative to said hub member and slidably receiving said cultivator lift member, an angularly movable clamping member adapted to encircle said cultivator lift member, a foot pedal mounted for rocking movement on said hub member, a brace extending from said foot pedal to said clamping member and pivotally connected with the foot pedal and said clamping member, a link member pivotally connected with said foot pedal and said clamping member and adapted to cause the latter to hold said cultivator lift member against movement when said foot pedal is moved in one direction, and spring means associated with said foot pedal for moving the latter in the other direction so as to hold said clamping member normally in released position.

10. An agricultural implement comprising a pair of shiftable operating units, a single shifting means including resilient connections connected respectively with said units for shifting either or both of said units, a pair of foot pedals, and means connecting said foot pedals with said shiftable operating units, respectively, whereby either unit may be held against movement when the shifting means is operated to shift the other unit.

11. A tractor mounted implement comprising a pair of shiftable operating units, said tractor having a power operated member, means connecting the latter with said units whereby either or both of the units may be shifted by operation of said member, releasable means for holding either of said units against movement when said power operated member is operated to shift the other unit, means biasing said holding means for movement into a released position, and a manually controlled part associated with each holding means for shifting the latter into locked position.

12. In a tractor cultivator of the type in which the tractor includes a power lift rockshaft and the cultivator includes a movable lift member, a delayed lift attachment comprising an arm adapted to be fixed to said power lift shaft, an energy storing spring connected at one end with said arm, means adapted to connect the other end of said spring with said cultivator lift member, movable means adapted in one position to hold said cultivator lift member against movement, whereby the operation of said power lift shaft serves to store energy in said spring, and adapted in another position to release said cultivator lift member for movement whereby operation of said power lift rockshaft acts through said spring to move said cultivator lift member, biasing means acting against said holding means for urging it into its released position, and means for moving said holding means into its holding position.

13. In a tractor cultivator of the type in which the tractor includes a power lift rockshaft and the cultivator includes a movable lift member, a delayed lift attachment comprising an arm adapted to be fixed to said power lift shaft, an energy storing spring connected at one end with said arm, means adapted to connect the other end of said spring with said cultivator lift member, a supporting arm adapted to support said cultivator lift member and adapted to be loosely mounted on said power lift rockshaft, holding means adapted to be engaged with said cultivator lift member at a point spaced longitudinally thereof, a brace member connecting said holding means with said supporting arm, and means for controlling said holding means.

14. An implement lift comprising a rockshaft, a pair of arms, one fixed to said shaft and the other rockably mounted thereon, an implement lifting element connected with said second arm, and resilient means connecting said first arm with said element.

15. An implement lift comprising a rockshaft, a pair of arms, one fixed to said shaft and the other rockably mounted thereon, an implement lifting element connected with said second arm, resilient means connecting said first arm with said element, and releasable locking means for the latter.

16. An implement lift comprising a rockshaft, a pair of arms, one fixed to said shaft and the other rockably mounted thereon, an implement lifting element connected with said second arm, resilient means connecting said first arm with said element and releasable locking means for the latter, said locking means being carried in part by said lifting element and in part by said shaft.

17. An implement lift comprising a rockshaft, a pair of arms, one fixed to said shaft and the other rockably mounted thereon, an implement lifting element connected with said second arm, resilient means connecting said first arm with said element, releasable locking means for the latter, and means rockable on said shaft for controlling said locking means.

18. An attachment for a tractor implement having a lift shaft and a lifting element, said attachment comprising a clamp for said element and means rockable on said shaft for operating said clamp.

19. An attachment for a tractor implement having a lift shaft and a lifting element, said attachment comprising a clamp for said element, a brace extending from the tractor to the clamp, the latter being pivoted thereto, a rockable part on the tractor, and means connecting said rockable part with said clamp for operating the latter.

20. An attachment for a tractor implement having a power lift shaft and a movable lift member, said attachment comprising an angularly movable clamping member adapted to encircle said lift member, a foot pedal mounted for rocking movement on the tractor, a brace extending from said foot pedal to said clamping member and pivotally connected with the foot pedal and said clamping member, a link member pivotally connected with said foot pedal and said clamping member and adapted to cause the latter to hold said lift member against movement when said foot pedal is moved in one direction, and spring means associated with said foot pedal for moving the latter in the other direction so as to hold said clamping member normally in released position.

21. An agricultural implement comprising a pair of shiftable operating units, a single shifting means including resilient connections connected respectively with said units for shifting either or both of said units, a pair of separably operable manually actuated parts, and means connecting said parts with said shiftable operating units, respectively, whereby either unit may be held against movement when the shifting means is operated to shift the other unit.

22. A tractor mounted implement comprising a pair of shiftable operating units, said tractor having a power operated member, means connecting the latter with said units whereby either or both of the units may be shifted by operation of said member, releasable means for holding either of said units against movement when said power operated member is operated to shift the other unit, a pair of foot pedals, and means connecting said foot pedals with said releasable means, whereby either unit may be held against movement when the power operated member is operated to shift the other unit.

THEOPHILUS BROWN.
FRANK T. COURT.